United States Patent [19]

Szajnowski

[11] Patent Number: 4,967,380

[45] Date of Patent: Oct. 30, 1990

[54] DUAL CHANNEL SIGNAL PROCESSOR USING WEIGHTED INTEGRATION OF LOG-RATIOS AND ION BEAM POSITION SENSOR UTILIZING THE SIGNAL PROCESSOR

[75] Inventor: Wieslaw J. Szajnowski, Guildford, United Kingdom

[73] Assignee: Varian Associates, Inc., Palo Alto, Calif.

[21] Appl. No.: 333,770

[22] Filed: Mar. 31, 1989

Related U.S. Application Data

[63] Continuation of Ser. No. 97,500, Sep. 16, 1987, abandoned.

[51] Int. Cl.$^5$ ............................ G01K 1/08; G21G 5/00
[52] U.S. Cl. ...................................... 364/550; 250/397;
 250/492.2
[58] Field of Search .................... 364/550, 551.01, 524,
 364/525, 527, 581, 559; 340/811, 825.79;
 250/397, 491.1, 492.2, 492.1

[56] References Cited

U.S. PATENT DOCUMENTS

| | | | |
|---|---|---|---|
| 4,118,627 | 10/1978 | Porter et al. | 250/397 |
| 4,641,034 | 3/1987 | Okamura et al. | 250/492.21 |
| 4,700,071 | 10/1987 | Mori et al. | 250/397 X |
| 4,751,393 | 6/1988 | Corey, Jr. et al. | 250/397 X |
| 4,761,559 | 8/1988 | Myron | 250/397 X |

OTHER PUBLICATIONS

Geipel, H. et al., "In-Line Ion-Beam Monitor", IBM Tech. Discl. Bull., vol. 20, No. 5, Oct. 1977, pp. 1712–1713.
J. L. Ter Haseborg et al., "Detection of Projectiles by Electric Field Measurements," IEEE Trans. on Aerospace and Electronic Systems, vol. AES-16, No. 2, Nov. 1980, pp. 750–753.
L. J. Maisel, "Noise Cancellation Using Ratio Detection," IEEE Trans. on Information Theory, Jul. 1968, pp. 557–562.
R. E. Shafer, "Characteristics of Directional Coupler Beam Position Monitors," IEEE Trans. on Nuclear Science, vol. NS-32, No. 5, Oct. 1985, pp. 1933–1937.
Silicon Detector Corporation Brochure, Form No. 400–44–003, Rev. B. "Position Sensors".
J. Jacovitti, "Performance Analysis of Monopulse Receivers for Secondary Surveillance Radar," IEEE Trans. on Aerospace and Electronic Systems, vol. AES-19, No. 6, Nov. 1983, pp. 884–897.
W. J. Szajnowski, "Monitoring the Tilt Angle of an Ion Beam Cross–Section," Electronics Letters, vol. 20, No. 14, Jul. 5, 1984, pp. 600–601.
W. J. Szajnowski, "Estimation of Time-Varying Coordinates of Ion Beams," Electronics Letters, vol. 17, No. 14, Jul. 9, 1981, pp. 489–490.
M. Nakamura, et al., "Beam Position Monitor System for Storage Rings," IEEE Trans. on Nuclear Science, vol. NS-32, No. 5, Oct. 1985, pp. 1985–1987.

(List continued on next page.)

Primary Examiner—Joseph L. Dixon
Attorney, Agent, or Firm—Stanley Z. Cole; Edward H. Berkowitz

[57] ABSTRACT

A signal processor receives random input signals from a pair of sensors such as beam sensing electrodes, antennas, microphones or optical position sensors. An estimation equation implemented by the signal processor uses weighted integration of log ratios where the weighting is adaptive and depends upon the values of signal samples being processed. The signal processor uses digital signal processing to provide an estimate of the desired parameter. Nonlinear functions such as hyperbolic tangent and logarithm are contained in programmable read only memories in order to obtain high speed operation. When the signal processor is used in conjunction with channel switching, errors due to channel mismatch are completely eliminated. In a preferred embodiment, the sensors are beam sensing electrodes and the signal processor is used for estimating the position of a scanned ion beam in a ion implantation system.

25 Claims, 6 Drawing Sheets

OTHER PUBLICATIONS

M. Sachidananda et al., "$Z_{DR}$ Measurement Consideration for a Fast Scan Capability Radar," *Radio Science*, vol. 20, No. 4, pp. 907–922, Jul.–Aug. 1985, FIG. 16b.

W. J. Szajnowski, "A Three-Electrode System for Locating Charged-Particle Beams," *Nucl. Instrum. Methods in Phys. Res.*, 226, (1984), pp. 549–551.

W. J. Szajnowski et al., "Ion Beam Coordinate Monitor," *Electronics Letters*, vol. 16, No. 17, Aug. 14, 1980, pp. 674–675.

W. J. Szajnowski, "Measurement of Ion Beam Parameters with Electrostatic Induction Electrodes," *Vacuum*, vol. 34, Nos. 1–2, pp. 285–289, 1984.

W. J. Szajnowski, "Extraction of Information on a Continuous Ion Beam from Beam-Induced Shot Noise," *Nuclear Instruments and Methods in Physics Research*, B6, 1985, pp. 176–182.

V. N. Bringi et al., "Statistical Properties of the Dual-Polarization Differential Reflectivity ($Z_{DR}$) Radar Signal," *IEEE Trans. Geoscience & Remote Sensing*, vol. GE-21, No. 2, Apr. 1983, pp. 215–219.

M. S. Hodgart et al., "Remote Ion Beam Position Measurement from Random Beam Modulation," Inst. Phys. Conf., Ser. No. 38, 1978, Chapter 3, pp. 125–130.

W. J. Szajnowski, "Non-Destructive Techniques for Measuring the Parameters of Low-Energy Continuous Ion Beams," Proc., 4th Int. Conf. on Ion Implantation, Berchtesgaden, 1982, W. J. Szajnowski, "Non-Destructive Ion Beam Position Monitors," ISIAT and IPAT Congress, Kyoto, Sep. 1983.

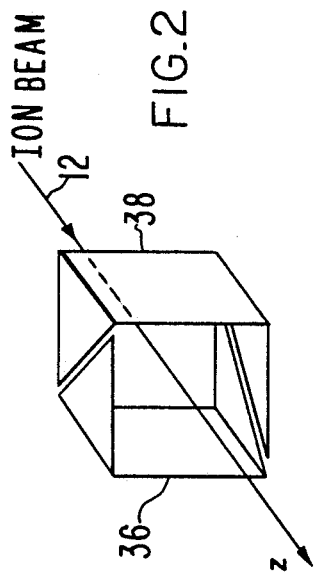
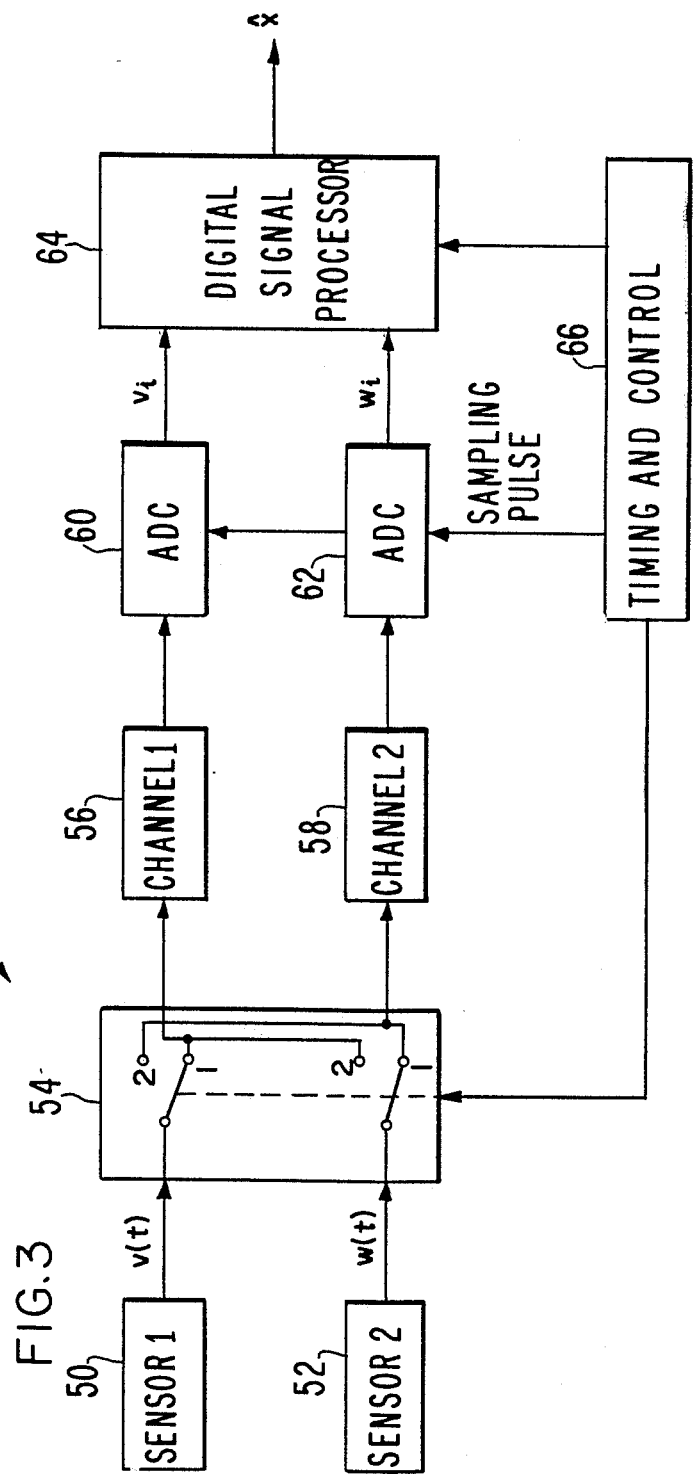

DUAL CHANNEL SIGNAL PROCESSOR USING WEIGHTED INTEGRATION OF LOG-RATIOS AND ION BEAM POSITION SENSOR UTILIZING THE SIGNAL PROCESSOR

This application is a continuation of application Ser. No. 097,500, filed Sept. 16, 1987, now abandoned.

FIELD OF THE INVENTION

This invention relates to a signal processing apparatus for accurately determining the relative values of two random signals and, more particularly, to a signal processor utilizing weighted integration of log-ratios and channel switching for accurately estimating a parameter associated with a random process. The signal processor is particularly useful in apparatus for sensing the actual position of a scanned ion beam without intercepting or otherwise affecting the beam, but is not limited to such use.

BACKGROUND OF THE INVENTION

In the ion implantation of semiconductor devices, a beam of energetic ions is directed at the surface of a semiconductor wafer. The ions are embedded in the wafer and provide regions of desired conductivities. The beam is typically scanned in one or two dimensions by electrostatic or magnetic deflection to produce a uniform distribution of ions over the wafer surface. The ion implantation system utilizes different ion species, different acceleration voltages and different beam currents for different processes. In addition, the system is required to scan different size areas, depending on the size of the wafer being implanted. In spite of the numerous variables, it is required that the ion implantation system supply an accurate ion dosage to the wafer with a high degree of spatial uniformity.

In order to accurately control the ion implantation process, it is desirable to know the instantaneous position of the scanned ion beam in a plane perpendicular to the nominal beam axis. The beam position information can, for example, be used in a feedback system to control scanning. The scan voltage applied to the deflection plates or to the scan magnets provides some indication of the beam position. However, due to the variability of the ion species, beam currents and beam energies and a number of other factors, it is difficult to accurately relate scan voltage to beam position. One technique for determining actual beam position is to locate a Faraday cup or sensing wire in the beam path. This technique interferes with the beam and must be utilized during a calibration mode. As a result, it slows down overall system speed and is impractical.

It is known to sense the position of an ion beam by placing sensing electrodes on opposite sides of the beam. Noise modulation on the ion beam induces voltages on the sensing electrodes. When the electrodes are symmetrically positioned with respect to the beam, the deviation of the beam from its nominal axis can be determined by processing the random signals induced on the two electrodes. This technique is described, for example, in (1) M. . Hodgart et al, "Remote Ion Beam Position Measurement From Random Beam Modulation," Inst. Phys. Conf., Ser. No. 38, 1978, Chapter 3, pp. 125–130; (2) W. J. Szajnowski, "Non-Destructive Techniques for Measuring the Parameters of Low-Energy Continuous Ion Beams," Proc., 4th Int. Conf. on Ion Implantation, Berchtesgaden, 1982; (3) W. J. Szajnowski, "Non-Destructive Ion Beam Position Monitors," ISIAT and IPAT Congress, Kyoto, September 1983; (4) W. J. Szajnowski, "Measurement of Ion Beam Parameters With Electrostatic Induction Electrodes," Vacuum, Vol. 34, Nos. 1-2, pp. 285–289, 1984; (5) W. J. Szajnowski, "Extraction Of Information On A Continuous Ion Beam From Beam-Induced Shot Noise," Nuclear Instruments and Methods in Physics Research, B6, 1985, pp. 176–182.

These references disclose functions for estimating the position of the beam based on the random signals induced on the two electrodes. The above-identified Szajnowski article in Vacuum Instruments and Methods discloses a maximum discloses a closed-loop scan generator for use in an ion implanter to precisely tailor scan patterns. The above-identified Szajnowski article in Nuclear Instruments and Methods discloses a maximum likelihood estimator for determining the position of an ion beam and also a sub-optimum estimator. The same article also suggests applications of the beam position measurement including alignment of the beam centroid, implementing an optimum scan pattern, stabilization of beam energy, monitoring the tilt angle of the beam's cross-section, monitoring the beam expansion during transport, and monitoring the stability and statistical properties of ion sources. A simple version of a log-ratio estimator without weighting has been described by V. N. Bringi et al in "Statistical Properties of the Dual-Polarization Differential Reflectivity (ZDR) Radar Signal," IEEE Trans. Geoscience And Remote Sensing, Vol. GE-21, No. 2, April, 1983, pp. 215–219 (see equation (8)).

One source of error in practical dual-channel signal processors is the mismatch between channels of both amplitude and phase response. The two channels can be equalized to some extent by trimming. However, trimming over a several megahertz frequency band is difficult. It is well known that the instrumentation error due to channel mismatch can be reduced by channel switching (see, for example, M. Sachidananda et al, "ZDR Measurement Considerations For a Fast Scan Capability Radar," Radio Science, Vol. 20, No. 4, T pp. 907–922, July-Aug. 1985, FIG. 16b). However, the instrumentation error due to channel mismatch is not entirely eliminated when used with prior art signal processors.

In order for the above-described beam monitoring technique to be practical for real time monitoring of beam position in commercial ion implantation systems, it must meet certain requirements. These requirements include a high accuracy for a variety of ion species, for beam currents typically in the range of 0.1 microampere to 30 milliamperes, for beam energies typically in the range from 10 keV to 400 keV, for scan areas up to 8 inches square and for scan frequencies typically up to 1,000 Hz. The sensor must be able to accurately reproduce the beam position as a function of time under all the above conditions.

In prior art beam position sensing techniques, errors have arisen from a variety of sources including:

(1) Gain mismatch between the two processing channels. Gain is difficult to match in both magnitude and phase over the required frequency band of a few megahertz.

(2) The nonstationary random characteristics of a beam-induced signal result in fading of the signal and short spikes exceeding the dynamic range of an amplifier.

(3) Analog implementation of signal processors perform the required difference/sum normalization utilizing divider circuits, automatic gain control and logarithmic conversion. All analog circuits implementing these functions are not precise and require adjustments.

(4) Prior art techniques cannot accurately track the time varying position of the rapidly scanned beam because of the phase distortions of the reconstructed beam path. These are dynamic errors.

The requirement for processing two random signals and determining the relative values thereof has been described above in connection with determining the position of a scanned ion beam in an ion implanter system. Equivalent requirements arise in other technical fields. For example, an ion beam position sensor can be utilized in a high energy accelerator to determine the position of various charged particle beams. Similar signal processing requirements arise in connection with optical position sensors, weather radar for rainfall estimation, monopulse radar systems and sonar systems for angle-of-arrival estimation, radio astronomy systems for tracking a radio source, and detection of projectiles by electric field measurements. In general, the signal processing requirements arise in connection with any measurement system for computing difference/sum ratios of two random signals corrupted by noise.

It is a general object of the present invention to provide improved signal processing apparatus.

It is another object of the present invention to provide signal processing apparatus for determining the relative values of two random signals with extremely small error.

It is still another object of the present invention to provide signal processing apparatus which when utilized with channel switching, completely eliminates errors due to channel mismatch.

It is yet another object of the present invention to provide signal processing apparatus utilizing weighted integration of log-ratios where the weighting is adaptive and depends upon the values of signal samples being processed.

It is a general object of the present invention to provide improved apparatus for real time monitoring of the position of an ion beam relative to its axis.

It is a further object of the present invention to provide apparatus for accurately monitoring the position of an ion beam for different beam currents, beam energies and ion species.

It is a further object of the present invention to provide apparatus for accurately monitoring the position of a rapidly-scanned ion beam.

It is yet another object of the present invention to provide apparatus for monitoring the position of an ion beam without interfering with the beam.

SUMMARY OF THE INVENTION

According to the present invention, these and other objects and advantages are achieved in apparatus for monitoring the position of an ion beam and providing an estimate of beam position relative to a coordinate system. The apparatus comprises a pair of electrodes positioned adjacent to the ion beam to cause sensed signals $v(t)$, $w(t)$ to be induced on the pair of electrodes, respectively, by the ion beam and signal processing means coupled to the pair of electrodes for determining an estimate of the beam position. The signal processing means includes means for sampling the sensed signals $v(t)$, $w(t)$ at prescribed intervals and for converting the sensed signals to digital samples $v_i$, $w_i$, and means for calculating the estimate of beam position as a solution to the sub-optimum estimation equation $$\tanh\left[\frac{1}{2}\left(\sum_{i=1}^{N} P_i \ln\left(\frac{|v_i|}{|w_i|}\right)\right) \bigg/ \left(\sum_{i=1}^{N} P_i\right)\right]$$

where $$P_i = [v_i + w_i]^2$$

N = number of sample pairs used in estimate, and
tanh is the hyperbolic tangent

The apparatus utilizes digital sampling of the sensed signals from the two electrodes and digital processing of the samples to yield an estimate of beam position. The sampling means comprises a first channel for sampling one of the sensed signals $v(t)$, and a second channel for sampling the other of the sensed signals $w(t)$. The estimation equation uses weighted integration of log-ratios where the weighting is adaptive and depends upon the values of signal samples being processed.

Errors due to channel mismatch are eliminated by channel switching. Channel switching means coupled between the pair of electrodes and the sampling means switches the sensed signals $v(t)$ and $w(t)$ between the first and second channels during calculation of the estimate so that the estimate is independent of mismatch between the first channel and the second channel. Preferably, the nonlinear functions such as hyperbolic tangent and logarithm are contained in programmable read only memories in order to obtain high speed operation.

According to another aspect of the invention, there is provided signal processing apparatus for receiving electrical signals $v(t)$ and $w(t)$ from a pair of sensors and for determining an estimate of a parameter from the signals. The signal processing apparatus includes means for sampling the sensed signals $v(t)$, $w(t)$ at prescribed intervals and for converting the sensed signals to digital samples $v_i$, $w_i$, and means for calculating the estimate as a solution to the equation estimate =

$$\tanh\left[\frac{1}{2}\left(\sum_{i=1}^{N} P_i \ln\left(\frac{|v_i|}{|w_i|}\right)\right) \bigg/ \left(\sum_{i=1}^{N} P_i\right)\right]$$

where N = number of sample pairs use in estimate, and $$P_i = (v_i + w_i)$$

Preferably, the signal processor is implemented as a two channel digital processor, and channel switching is used to eliminate channel mismatch errors. The sensors can be beam sensing electrodes, antennas, microphones, optical position sensors, or any other suitable sensors.

BRIEF DESCRIPTION OF THE DRAWINGS

For a better understanding of the present invention together with other and further objects, advantages and capabilities thereof, reference is made to the accompanying drawings which are incorporated, herein by reference and in which:

FIG. 2 illustrates a preferred electrode structure for, beam sensing;

FIG. 3 is a general block diagram of a sensing and signal processing system in accordance with the present invention;

DETAILED DESCRIPTION OF THE INVENTION

Figure 1:
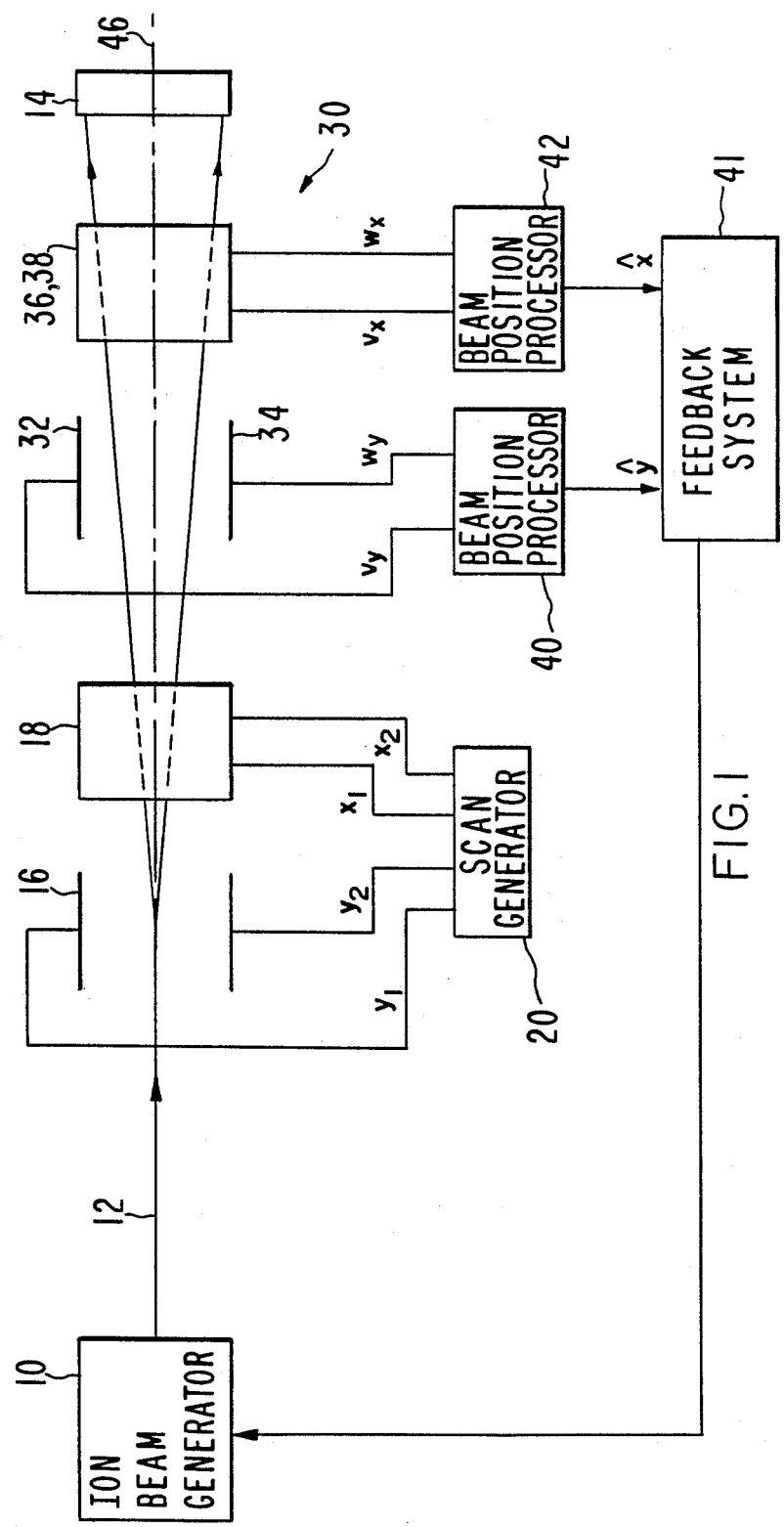
FIG 1 is a schematic diagram of an ion implantation system including apparatus for sensing beam position in accordance with the present invention.

A block diagram of a scanned ion beam system utilizing a beam position monitor in accordance with the present invention is illustrated in FIG. 1. An ion beam generator 10 directs an ion beam 12 at a target 14 which is typically a semiconductor wafer. The ion beam generator 10 includes suitable elements for producing a well-defined beam of ions of a prescribed species and energy. In accordance with well-known techniques, the ion beam generator 10 typically includes an ion source, a mass analyzer magnet and a resolving aperture for separating undesired species, an acceleration tube for accelerating the ions and optical elements for focusing the beam in the target plane.

The beam 12 is scanned in the y direction by a pair of electrostatic deflection plates 16 and is scanned in the x direction by a pair of electrostatic deflection plates 18, both of which are positioned along the beam path. Y axis scan voltages $y_1$, $y_2$ and x axis scan voltages $x_1$, $x_2$ are supplied by a scan generator 20. The scan voltages are typically ramp voltages which produce a conventional raster scan over the area of the target 14. In a typical serial ion implantation system, a scan rate of 1,000 Hz is utilized.

Two-dimensional electrostatic scanning of the ion beam 12 is illustrated in FIG. 1. Alternatively, the beam 12 may be scanned in one dimension by magnetic fields, while mechanical movement of the target 14 is utilized to distribute the beam over the target area. In a typical batch ion implantation system, a magnetic scan rate of about 1 Hz is utilized.

A beam position monitor in accordance with the present invention includes a pair of y axis sensing electrodes 32, 34 and a pair of x axis sensing electrodes 36, 38. The sensing electrodes 32, 34 supply sensed signals $v_{yy}(t)$ and $w_y(t)$, respectively, to a y axis beam position processor 40, and sensing electrodes 36, 38 supply sensed signals $v_x(t)$ and $w_x(t)$, respectively, to an x axis beam position processor 42. The beam position processors 40 and 42 process the sensed signals and provide estimate $\hat{y}$ and $\hat{x}$, respectively, of the beam position in each direction. These estimates are then fed through a feedback system 41 to the ion generator 10 to control scanning.

As the beam 12 passes between the sensing electrodes, voltages are induced on each of the electrodes. The voltages arise from natural random modulation within the beam as described in the prior art. When the electrodes are symmetrically positioned with respect to a beam axis 46 and the beam is passing along the axis 46 (undeflected), equal voltages are induced on electrodes 32, 34 and on electrodes 36, 38. As the beam 12 is deflected closer to one electrode, the induced voltage on that closer electrode increases and the induced voltage on the other more distant electrode decreases. Thus, the magnitudes of the voltages induced on each pair of electrodes can be used to estimate the position of the beam 12 relative to the axis 46. The electrodes 32, 34 sense the beam position in the y direction while the electrodes 36, 38 sense the position of the beam 12 in the x direction.

A preferred sensing electrode structure is shown in FIG. 2. It consists of a shell of arbitrary cross-section (square, rectangular, circular) split diagonally to define two electrodes. In the example of FIG. 2, the electrodes 36 and 38 have a square cross-section. The configuration which surrounds the beam 12 provides substantially better linearity and sensitivity than a pair of parallel plates. Each pair of electrodes senses the beam position along one axis, and two pairs of electrodes with a relative orientation of 90° are utilized to sense the beam position in two dimensions.

A system in accordance with the present invention for accurately estimating a parameter x associated with a random process is illustrated in block diagram form in FIG. 3. A pair of sensors 50 and 52 sense the desired random phenomena and supply signals v(t) and w(t), respectively, to a channel switch 54. The outputs of the channel switch 54 are supplied to a first channel 56 and to a second channel 58. The channel switch 54 is an electronically controlled switch having two states. In state 1, signal v(t) from sensor 50 is supplied to the first channel 56 and signal w(t) from sensor 52 is supplied to second channel 58. In state 2, the connections are reversed and signal v(t) from sensor 50 is supplied to second channel 58 and signal w(t) from sensor 52 is supplied to first channel 56. In accordance with well-known techniques, each of channels 56 and 58 typically includes a low-noise, wide band preamplifier, a gain control stage, a low pass filter and a buffer amplifier for driving an analog-to-digital converter. The outputs of channels 56 and 58 are supplied to analog-to-digital converters 60 and 62, respectively, which sample the sensed signals and provide samples $v_i$ and $w_i$ to the digital signal processor 64. The output of the digital signal processor 64 is an estimate of the parameter being measured. The system further includes a timing and control unit 66 which supplies a switch control signal to channel switch 54, sampling pulses to analog-to-digital converters 60 and 62 and timing and control signals to digital signal processor 64.

For ion beam position sensing in accordance with the present invention, the sensors 50 and 52 correspond to the beam sensing electrodes shown and described hereinabove. One processor system as shown in FIG. 3 is required for x axis beam position sensing, and another system is required for y axis beam position sensing. Thus, for processor 40 of FIG. 1, sensors 50 and 52 correspond to electrodes 32 and 34, while for processor 42, the sensors 50 and 52 correspond to electrodes 36 and 38. For other applications, the sensors 50 and 52 may be optical position sensors, antennas, microphones or some other type of transducers. The outputs of the sensors 50 and 52 are random electrical signals v(t) and w(t).

Digital signal processing involves quantization of input signals, v(t) and w(t). If averages, or correlations are computed from quantized samples, $v_i$ and $w_i$, the roundoff will increase the rms error of the estimate and also may introduce some bias to the estimate. For many signals encountered in practical situations, however, theoretical studies have shown that the biasing effects of quantization average out.

The digital samples, $v_i$ and $w_i$, obtained at the outputs of the two ADCs are the quantized versions of the two signals v(t) and w(t) which can be expressed as $$v_i = (1 + xs_E/A_x)s_i + n_{1i} \quad (1)$$

$$w_i = ('-XS_E/A_x)s + n_{2i} \quad (2)$$

where:
x-coordinate of the beam centroid, $|x| \leq A_x$;
$S_E$-sensitivity of the electrode system, ($S_E < 1$);
$2A_x$-width of the working aperture of the system;
$s_i$-sample of the beam-induced signal when x=0;
$n_{1i}$-samples of thermal noise in channel 1;
$n_{2i}$-samples of thermal noise in channel 2;

For practical designs of electrode system, the sensitivity, $S_E$, will vary from approximately 0.2 (for short systems) to 0.7.

It is assumed that the noise samples, $n_{1i}$ and $n_{2i}$, can be modelled as two mutually independent discrete-time Gaussian processes with zero means and rms values equal to $\tau_n$. The signal samples, $s_i$, represent a discrete-time random process with zero mean and rms value equal to $\tau_s$.

The equations (1) and (2) are valid for electrode systems with linear characteristics. For other electrode systems, particularly short systems, the above equations will be modified as follows:

$$v_i + [1 + \Phi(x/A_x)]s_i + n_{1i} \quad (3)$$

$$w_i = [1 - \Phi(x/A_x)]s_i + n_{2i} \quad (4)$$

where $\Phi(x/A_x)$ is a nonlinear function describing the electrode characteristics. In such cases, the sensitivity varies over the electrode aperture. Typically for short electrode systems, the sensitivity of 0.1 at the central position rises to 0.3 for the extreme beam positions.

Assume that an ion beam is scanned linearly with a period $T_s$ and an amplitude $X_s$. Theoretical analysis has shown the rms error, $\tau_x$, of a position estimate $\hat{x}_j$, computed at the time instant $t_j$, can be expressed as $$\tau_x = X_s \sqrt{1 + S_E^{-2}} /[2d\sqrt{2N\eta}] \quad (5)$$

where
$X_s$-scan amplitude;
$S_E$-sensitivity of the electrode system;
d-signal-to-noise ratio (SNR), defined by
d=$\tau_s/\tau n$;
N-number of independent sample pairs, $v_i$ and $w_i$, used for estimation;
$\eta$-efficiency of an estimation procedure implemented.
The efficiency, $\eta$, is defined by the ratio $$\eta = \tau_{\hat{x}o}^2/\tau_{\hat{x}1}^2 \quad (6)$$

where $\tau_{\hat{x}o}$ and $\tau_{\hat{x}l}$ are the rms errors of the optimum procedure and the one implemented, respectively. Generally, the efficiency, $\eta$, of procedures attractive from a practical viewpoint is not less than 0.5 and may be even as high as 0.9.

Consider two consecutive position estimates, $\hat{x}_j$ and $\hat{x}_{j+1}$, computed at the time instants $t_j$ and $t_{j+1}$. In practice, the time difference between two such samples should be so chosen as to obtain small values of rms errors $\hat{\tau}$ with reference to the sampling distance $\Delta X$.

If we assume that the spectrum of beam induced signals, v(t) and w(t), is limited by $B_s$ and that the Nyquist sampling is used, then the number, N, of independent pairs, $v_i$ and $w_i$, can be expressed as $$N = B_s T_s \Delta X/S_s \quad (7)$$

The above results can be combined to establish the minimum value of the signal/noise ratio, $d_{min}$, required to obtain $N_x$ reliable equidistant position samples over the (0, $X_s$) interval. Assuming that $\tau \hat{X} = 0.166 X$, the value of $d_{min}$ is equal to $$d_{min} = 3.5 \sqrt{1 + S_E^{-2}} \sqrt{F_3/B_5} \, \eta^{-\frac{1}{2}} N_x^{3/2} \quad (8)$$

where $F_s$ denotes the scanning frequency.

To determine the typical values of $d_{min}$ required, let us consider two simple examples.

EXAMPLE 1:

$S_E=0.6$ (linear electrode system)
$F_s=500$ Hz
$B_s=2$ MHz
$\eta=1$ (optimum signal processor). For the above set of parameters, $d_{min}$ equals $$d_{min} = 0.11 \, N_x^{3/2} \quad (9)$$

As seen, to obtain 20 reliable position samples along $X_s$, the required signal/noise ratio has to be greater than 10. For $N_x=40$, the value of $d_{min}$ rises to 28.

EXAMPLE 2:

$S_E=0.2$ (short electrode system)
$F_s=1$ Hz
$B_s=2$ MHz
$\eta=0.5$ (sub-optimum signal processor).
In this case, the required value of $d_{min}$ equals $$d_{min} = 0.018 \, N_x^{3/2} \quad (10)$$

To obtain 100 reliable position samples along $X_s$, $d_{min}$ has to be about 18.

A sub-optimum estimator described previously in the literature is of the form $$x_s = \sum_{i=1}^{N} [v_i^2 - w_i^2] / \sum_{i=1}^{N} [v_i + w_i]^2 \quad (11)$$

where N is the number of sample pairs used for estimation. For the purpose of digital processing, equation (11) can be expressed in an equivalent form $$OX \left( \sum_{i=1}^{N} P_i \frac{(v_i - w_i)}{(v_i + w_i)} \right) / \left( \sum_{i=1}^{N} P_i \right) \quad (12)$$

where $$P_i = 8[v_i + w_i]^2 \quad (13)$$

This is essentially a weighted average of a commonly used difference/sum ratio estimator. The basic advantage offered by the form of equation (12) is that in a digital processor, the difference/sum values can be stored in a PROM (need not be computed) and the weights $P_i$ can be represented by a small number of bits (four or less). Depending on the number of bits to represent $P_i$, the algorithm performance will vary.

The identity.

$$\frac{a-b}{a+b} = \tanh\left[\tfrac{1}{2}\ln\left(\frac{a}{b}\right)\right], \, a,b > 0 \quad (14)$$

where tanh(.) denotes the hyperbolic tangent function suggests, a new sub-optimum estimator of the form.

$$\tanh\left[\tfrac{1}{2}\left(\sum_{i=1}^{N} P_i \ln\left(\frac{|v_i|}{|w_i|}\right)\right) \bigg/ \left(\sum_{i=1}^{N} P_i\right)\right] \quad (15)$$

with $P_i$ defined by equation (13). The estimator of equation (15) is essentially a weighted average of log-ratio values, followed by a nonlinear transformation.

Figure 4:
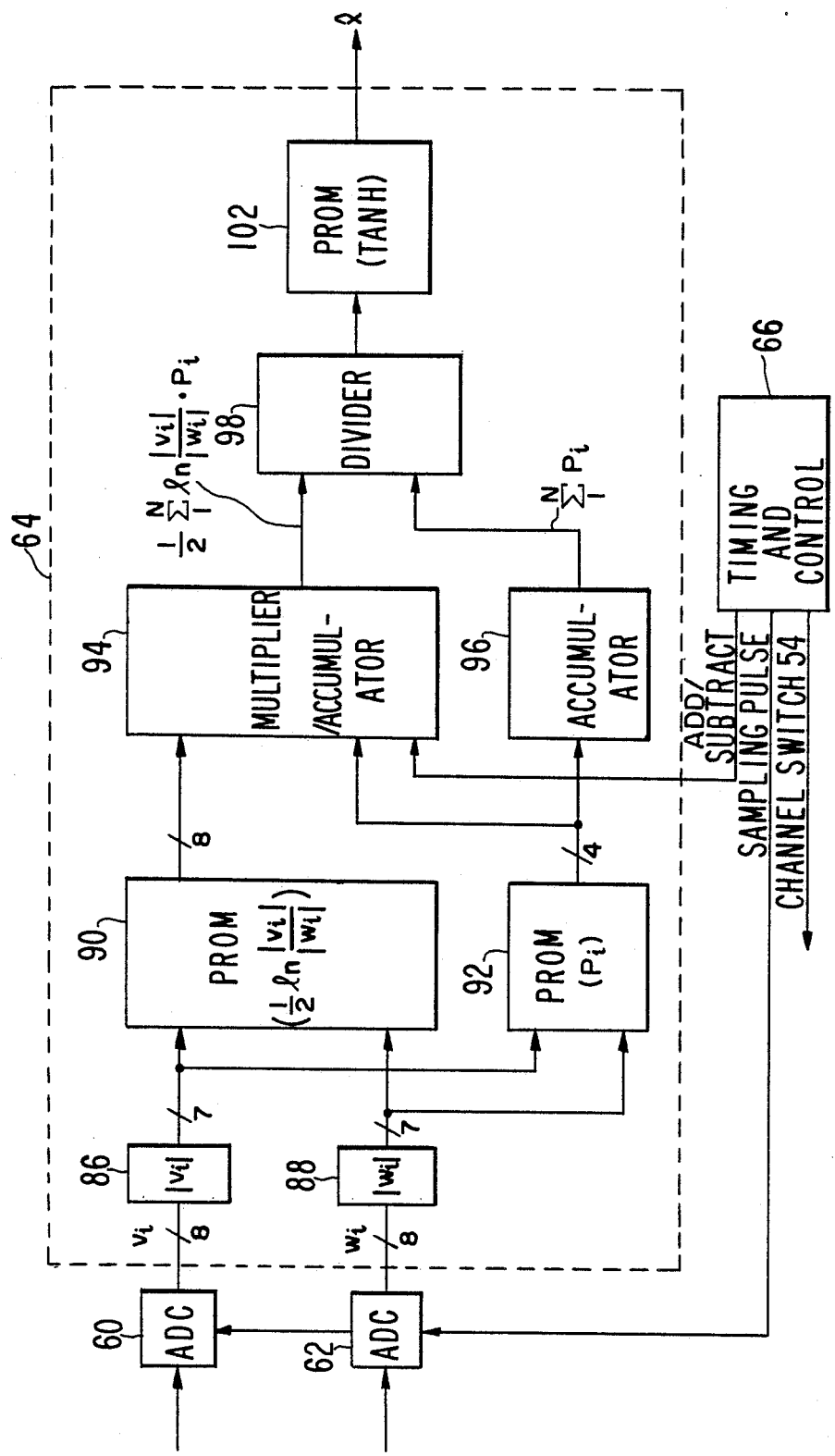
FIG. 4 is a block diagram of a sub-optimum signal processor in accordance with the invention.

One possible digital implementation of equation (15) is shown in FIG. 4. The elements contained within the dashed line represent the digital signal processor 64 of FIG. 3. The output samples $v_i$ from ADC 60 are supplied to the input of an absolute value circuit 86, and the output samples $w_i$ from ADC 62 are supplied to an absolute value circuit 88. The absolute value of $v_i$ from circuit 86 is supplied to address inputs of a programmable read only memory (PROM) 90 and to address inputs of a PROM 92. The absolute value of $w_i$ from circuit 88 is supplied to additional address inputs of PROM 90 and to additional address inputs of PROM 92. The PROM 90 provides at its output the value of $\tfrac{1}{2} \ln |v_i|/|w_i|$. The PROM 92 contains the values of the $P_i$ in accordance with equation (13) for example $P_i = (|v_i| + |w_i|)^2$ The outputs of PROM 90 are supplied to one input of a multiplier/accumulator 94. The outputs of PROM 92 are supplied to the other input of multiplier/accumulator 94 and to the input of an accumulator 96. An add-/subtract control line is coupled from timing and control unit 66 to multiplier/accumulator 94 for controlling whether the computed value for each sample is added to or subtracted from the accumulated total in accordance with the state of channel switch 54. Because of the logarithmic form of equation (15), changing the sign is equivalent to exchanging the arguments $|v_i|$ and $|w_i|$ (i.e., channel switching) at the output. The outputs of multiplier/accumulator 94 and accumulator 96 are supplied to the two inputs of a divider 98. The output of divider 98 is supplied to the address inputs of a PROM 102 which stores the values of tanh(Z) where Z is the value at its input. The output of PROM 102 is the beam position estimate.

The computation of the nonlinear functions: log ratio and hyperbolic tangent, is replaced by a table "look-up" operation (PROM 90 and PROM 102); an additional table (PROM 92) is used for weight computation. It is assumed that the log-ratio values, stored in PROM 90 are represented by 8-bit numbers, and the values of weights $P_i$, stored in PROM 92, are represented by a small number of bits, typically four or less.

Figure 5:
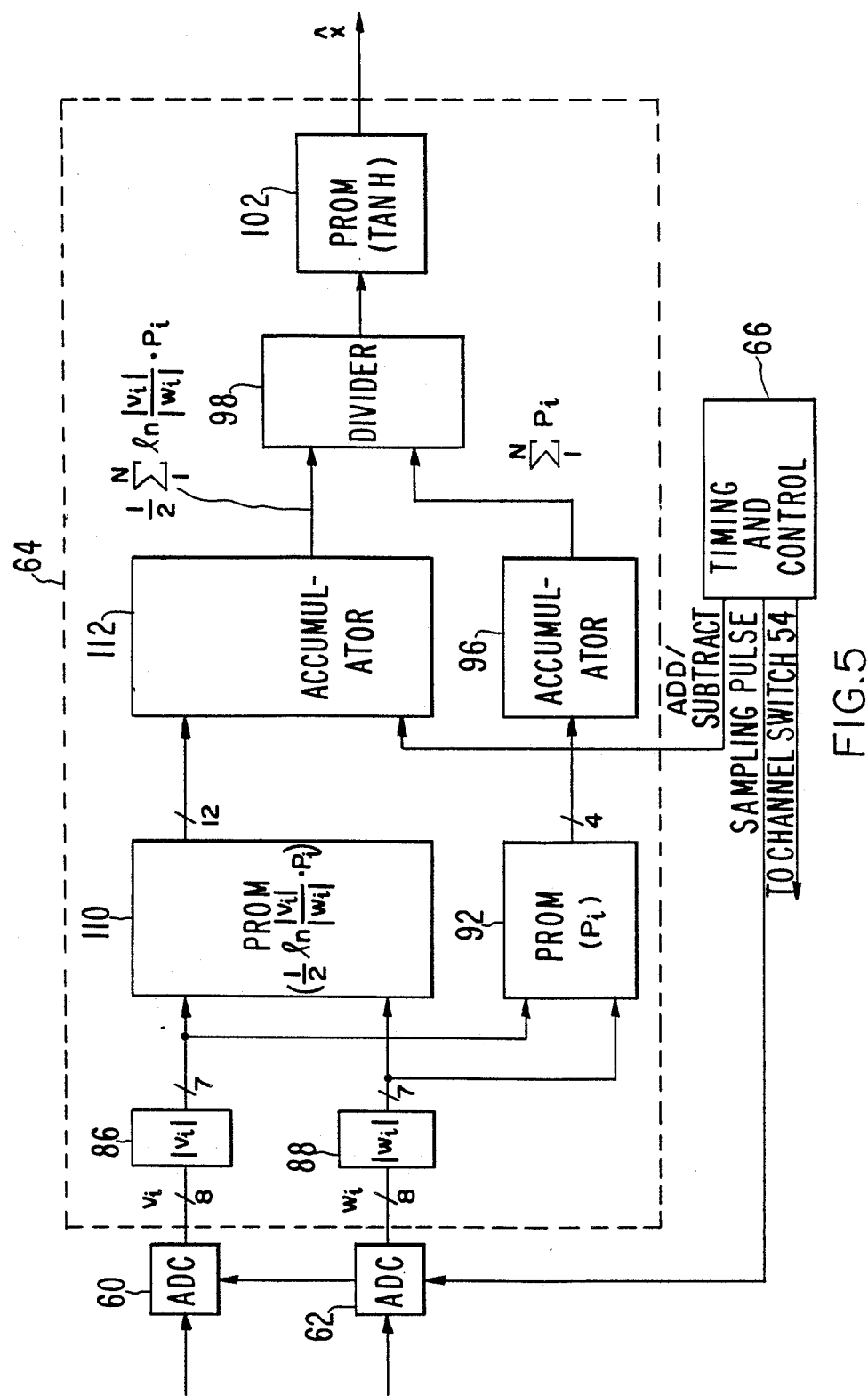
FIG. 5 is a block diagram of a another embodiment of a sub-optimum signal processor in accordance, with the present invention.

Another implementation of the equation (15) is shown in FIG. 5. This implementation is similar to the implementation shown in FIG. 4 and like elements have the same reference numerals. In this configuration, the PROM 90 of FIG. 4 is replaced $|v_i|/|w_i|$ multipled by the values of the weights $P_i$. This permits the multiplier/accumulator 94 of FIG. 4 to be replaced by an accumulator 112. Since the multiplication has been eliminated, the configuration of FIG. 5 provides faster data throughput.

Figure 6:
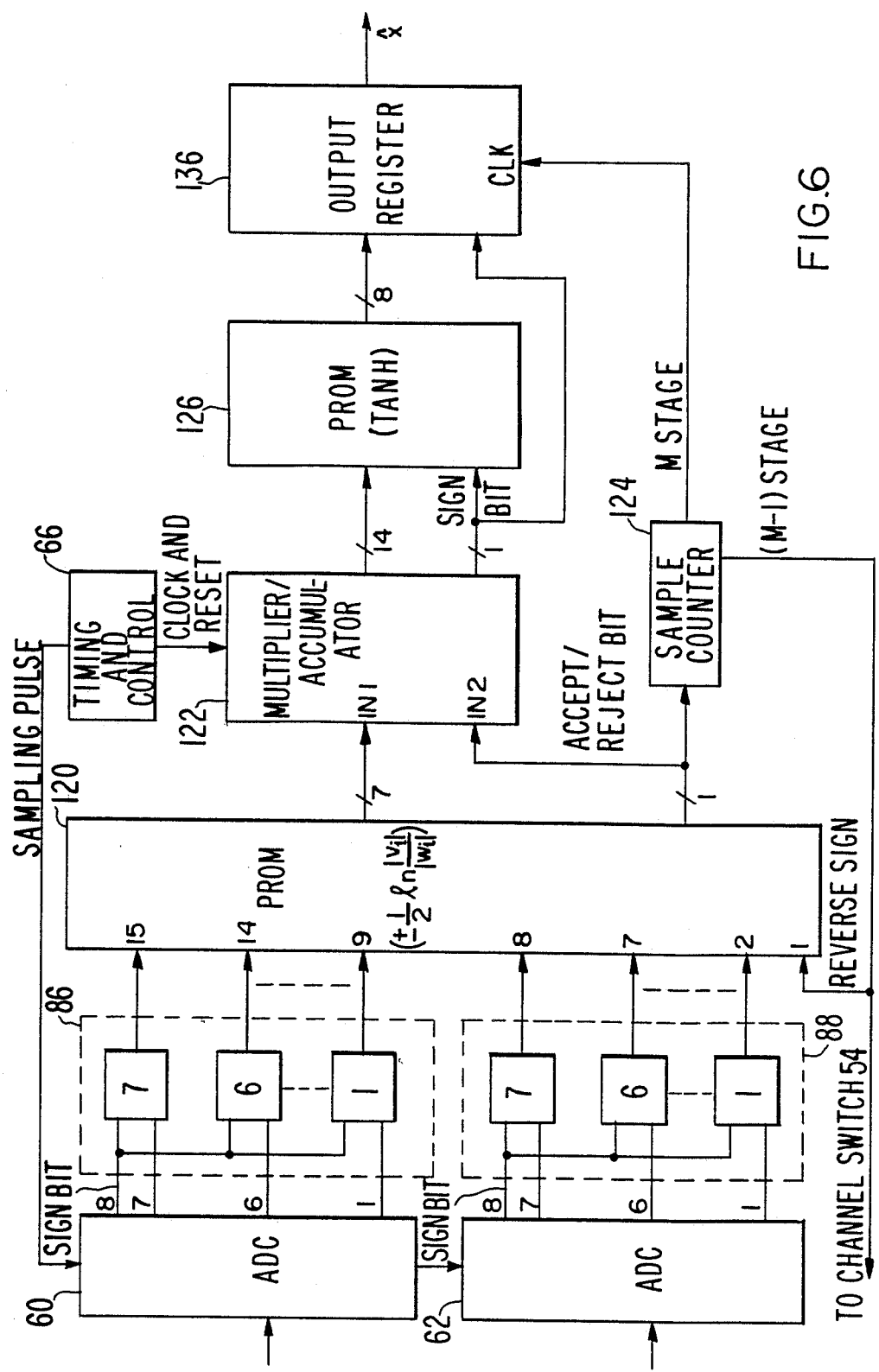
FIG. 6 is a block diagram of yet another embodiment of a sub-optimum signal processor in accordance with the invention.

The processor for implementing equation (15) assumes an extremely simple form when binary coding for $P_i$ is used. Such a processor is illustrated in FIG. 6. The samples $v_i$ from analog-to-digital converter 60 and samples $w_i$ from analog-to-digital converter 62 are supplied through absolute value circuits 86 and 88, respectively, to a PROM 120. One set of outputs from PROM 120 consisting of seven bits representing $+\tfrac{1}{2}\ln |v_i|/|wp_i|$ is coupled to one set of inputs of a multiplier/accumulator 122. A second output from the PROM 120 consisting of one bit representing the accept/reject bit, is coupled to a second input of the multiplier/accumulator 122 and is also coupled to the input of a sample counter 124 having M stages. The outputs of the multiplier/accumulator 122 are coupled to a PROM 126 which stores the hyperbolic tangent of the input values. The output of PROM 126 consisting of eight bits, is coupled to an output register 130. The output of register 130 is the desired position estimate $\hat{X}$, consisting of nine bits. A sign bit from the multiplier/accumulator 122 is coupled to an input of PROM 126 and to an input of register 130. The output of the Mth, or last stage of sample counter 124 is coupled to the clock input of output register 130. The output of the (M−1) stage of sample counter 124 is coupled to the an input of PROM 120 and is coupled to the control input of channel switch 54 (FIG. 3). The timing and control unit 66 provides a sampling pulse to the analog-to-digital converters 60 and 62 and clock and reset signals to the multiplier/accumulator 122.

In one example of the processor of FIG. 6, the analog-to-digital converters 60 and 62 were flash 8-bit, and converters type TS8308, the absolute value circuits were exclusive-Or gates type 7486 in Exclusive-Nor configuration, PROMS 120 and 126 were 32K words ×8 bits type 27256, multiplier/accumulator 122 was an 8-bit ×8-bit type 1008, sample counter 124 was a 14-stage binary counter type 4020 and output register 130 was a 9-bit D-type register type 39C821. It will be understood that the above components are given by way of example only.

The PROM 120 receives $|v_i|$ and $|w_i|$ and supplies at its output

1. $+\tfrac{1}{2} \ln |v_i|/|w_i|$ or $-\tfrac{1}{2} \ln |v_i|/|w_i|$ when the channels have been switched according to the sign reversing bit supplied to PROM 120 from the (M−1) stage of sample counter 124;

2. An accept/reject bit which is 1 if $$|v_i| + |w_i| \geq L$$

where L is a threshold level, and $$0 < |v_i| < 127$$

$$0 < |w_i| < 127$$

for an 8-bit ADC.

Figure 7:
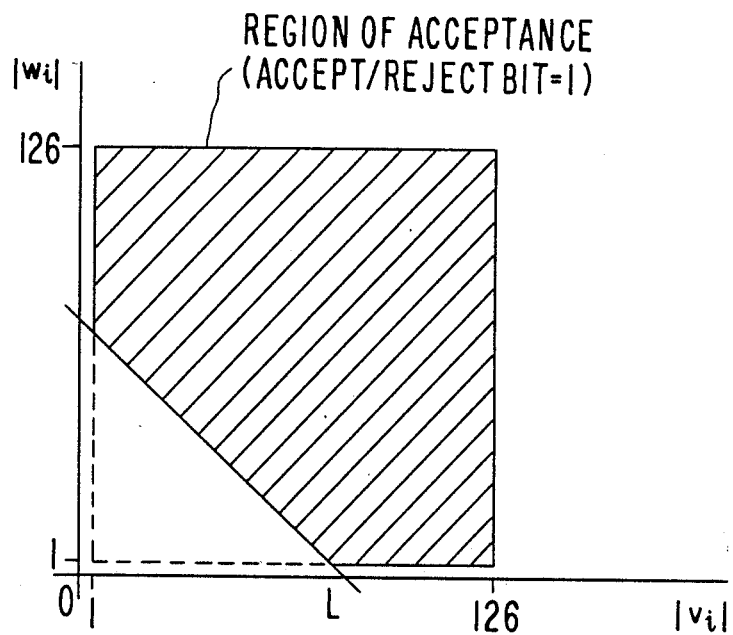
FIG. 7 is a graphic representation of the region of acceptance for the signal processor illustrated in FIG. 6.

Otherwise, the accept/reject bit is 0. The region of acceptance is illustrated in graphic form in FIG. 7. The example shown is for an 8-bit analog-to-digital converter where threshold level L is typically in the range between 64 and 96. The maximum value of 126 is selected for an 8-bit ADC since when the maximum output value 127 is provided, the input signal may exceed the range of the ADC. Similarly, lower values are rejected in order to reduce the effects of fading and to ignore values where the ADC has low conversion accuracy.

In operation of the processor of FIG. 6, signals v(t) and w(t) are converted to 8-bit digital words by converters 60 and 62 and their absolute values (7-bit words) are computed by circuits 86 and 88. The address of PROM 120 consists of 7-bits representing the absolute value of vi, another 7 bits representing the absolute value of $w_i$ and 1 sign reversing bit from the (M−1) stage of the sample counter 124. The outputs of the PROM 120 are 7 bits to represent $+\frac{1}{2} \ln |v_i|/|w_i|$, where the sign ± is defined by the sign reversing bit. The PROM 120 also supplies a 1-bit accept/reject signal as described above. When the accept/reject bit is 1, then the multiplier/accumulator 122 adds the value of $+\frac{1}{2}\ln |v_i|/|w_i|$ at the output of PROM 120 to its accumulated content. When the accept/reject bit is 0, then the output of PROM 120 is ignored. The sample counter 124 increments its state only when the accept/reject bit is 1. The total number of states in sample counter 124 is equal to the number of samples required for a position estimate. Thus, for example, when 100 samples are required to make a position estimate, the sample counter 124 has 100 states. The channel switching and sign reversing signal is obtained from the (M−1) stage of the sample counter 124. As a result, channel switch 54 is in state 1 during the first half of the measurement cycle and is in state 2 during the second half of the measurement cycle (or vice versa). In the above example, channel switch 54 would be in state 1 for 50 samples, and in state 2 for 50 samples. When the Mth stage of counter 124 changes its state, then the output of PROM 126 is transferred to the output register 130, thereby updating the value of the position estimate $\hat{X}$. In the above example, the Mth stage of counter 124 changes state after 100 samples.

In this case, the multiplication by $P_i$ reduces to addition of a log-ratio value, when $P_i=1$, and rejecting the sample pairs for which $P_i=0$. Moreover, if the number of accepted pairs (for which $P_i=1$) is fixed in advance, then the division can be substituted by a scaling operation performed on the sum of accumulated log-ratios. It should be pointed out, however, that if a number of accepted sample pairs is predetermined, then the total number of sample pairs passing through the processor to achieve that predetermined number will vary, depending on the statistical properties of signals being processed. In a practical system, the hyperbolic tangent conversion performed by PROM 126 can be combined with a calibration map of an electrode system, so that no additional memory is needed.

Although the performance of the log-ratio estimator of equation (15) is expected to be close to that of the sub-optimum estimator of equation (11), the log-ratio estimator can be used also to correct for any gain mismatch that may occur between the two analog channels prior to analog/digital conversion. To see how the gain mismatch affects the accuracy of a position measurement, assume that an ion beam is at central position and the two samples, $v_i$ and $w_i$, have passed through two channels with gains $G_v$ and $G_w$, respectively. If $G_v$ and $G_w$ are not equal, then the beam position estimated from the difference/sum ratio will differ from zero by $(G_v-G_w)/(G_v+G_w)$ even if no noise is present. To reduce this error, channel switching has been suggested in the literature (see *Radio Science*, Vol. 20, No. 4, pp. 907–922, July-Aug 1985, FIG. 16b). If, however, channel switching is used in conjunction with the log-ratio sub-optimum estimator as shown in FIG. 3 and described hereinabove, then the resulting procedure is totally independent of the channel gain mismatch. This extremely useful feature of the log-ratio estimator follows from the properties of a logarithmic function. The processor implementing the log-ratio estimator and incorporating the channel switching (FIG. 3) will be referred to as the gain-mismatch tolerant processor (or GMT processor).

The GMT processor estimates an ion beam position during the two cycles:

1. cycle 1-a signal induced on the electrode 1 passes through channel 1 and a signal induced on the electrode 2 passes through channel 2; the processor adds the log-ratio values.

2. cycle 2 - a signal induced on the electrode 1 passes through channel 2 and a signal induced on the electrode 2 passes through channel 1; the processor adds the log-ratio values with reversed signs.

When the two cycles have been terminated, the hyperbolic tangent operation is performed on the resulting sum of log-ratios.

To see why the GMT processor shown in FIG. 6 is insensitive to any gain mismatch between the two channels, assume that only one sample pair $(v_1, w_1)$ is processed during cycle 1 and another sample pair $(v_2, w_2)$ is processed during cycle 2. Next, suppose that the gains of the two channels are $G_v$ and $G_w$, respectively. During cycle 1, PROM 120 supplies the value of $\frac{1}{2} \ln G_v|v_1|/G_w|w_1|$ to the multiplier/accumulator 122. Next, the inputs of the two channels are switched and PROM 120 supplies values with reversed polarity. As a result, during cycle 2 a value of $-\frac{1}{2} \ln G_v|w_2|/G_w|v_2|$ added to the multiplier/accumulator 122. The result of those two operations equals $\frac{1}{2} \ln |v_1|/|w_1| + \frac{1}{2}\ln |v_2|/|w_2|$ which is the correct sum of the two log-ratios and which is not effected by the different channel gains $G_v$ and $G_w$. Moreover, since the analog-to-digital converters 60 and 62 are within the channels being switched, their different gains (scale factors) do not affect the accuracy of a position measurement.

While there has been shown and described what is at present considered the preferred embodiments of the present invention, it will be obvious to those skilled in the art that various changes and modifications may be made therein without departing from the scope of the present invention as defined by the appended claims.

What is claimed is:

1. Apparatus for controlling and monitoring the position of an ion beam based on an estimate of beam position relative to a coordinate system, said apparatus comprising:

a pair of electrodes positioned adjacent to the ion beam to cause sensed signals v(t), w(t) to be induced on the pair of electrodes, respectively, by the ion beam, signal processing means coupled to said pair of electrodes for determining an estimate of the beam position, including
    mean for sampling the sensed signals v(t), w(t) at prescribed intervals and for converting the sensed signals to digital samples $v_i$, $w_i$, and
    means for calculating the estimate of beam position as a solution to the equation $$\text{estimate} = \tanh\left[\frac{1}{2}\left(\sum_{i=1}^{N} P_i \ln\left(\frac{|v_i|}{|w_i|}\right)\right) \Big/ \left(\sum_{i=1}^{N} P_i\right)\right]$$

where N = number of sample pair used in estimate, and
$P_i$ is a weight determined by $v_i$ and $w_i$, and
a feedback system to control the beam based on determinations of beam position.

2. Beam position monitoring apparatus as defined in claim 1 wherein said sampling means comprises a first channel for sampling one of the sensed signals and a second channel for sampling the other of the sensed signals and further comprising channel switching means connected between said pair of electrodes and said sampling means for switching the sensed signals v(t) and w(t) between said first and second channels in first and second switch states during calculation of the estimate so that the estimate is independent of mismatch in the signal processing means.

3. Beam position monitoring apparatus as defined in claim 2 wherein said channel switching means further includes means for changing the sign of $\frac{1}{2} \ln |v_i|/|w_i|$ in accordance with said first and second switch states.

4. Beam position monitoring apparatus as defined in claim 1 wherein said calculating means includes programmable read only memory means for storing the function tanh (Z) where Z is the value at the input of the memory means.

5. Beam position monitoring apparatus as defined in claim 1 wherein said calculating means includes a programmable read only memory for storing the function $\frac{1}{2} \ln |v_i|/|w_i|$.

6. Beam position monitoring apparatus as defined in claim 1 wherein said calculating means includes a programmable read only memory for storing the function $P_i \cdot \frac{1}{2} \ln |v_i|/|w_i|$.

7. Beam position monitoring apparatus as defined in claim 1 wherein said sampling means includes a first analog-to-digital converter for sampling v(t) and producing digital samples $v_i$ and a second analog-to-digital converter for sampling w(t) and providing digital samples $w_i$.

8. Beam position monitoring apparatus as defined in claim including means for providing $P_i$ as a binary value of 1 or 0.

9. Beam position monitoring apparatus as defined in claim 8 wherein said means for providing comprises means for determining $P_i$ to have a value of 1 if the value of $|v_i| + |w|$ is greater than an predetermined threshold level, $|v_i|$ is within a predetermined range and $|w_i|$ is within a predetermined range, and a value of 0 otherwise.

10. Beam position monitoring apparatus as defined in claim 9 wherein the calculating means includes first programmable read only memory means for storing the values of $\frac{1}{2} \ln |vhd\ i|/|w_i|$ and the values of the weights $P_i$ and a multiplier/accumulator for accumulating the values of $\frac{1}{2} \ln |v_i|/|w_i|$ when $P_i$ has a value of 1.

11. Beam position monitoring apparatus as defined in claim 10 wherein the calculating means further includes second programmable read only memory means responsive to the outputs of the multiplier/accumulator for storing the hyperbolic tangent function and counter means for counting the samples for which $P_i$ has a value of 1, said counter means indicating that the output of said second programmable read only memory means is a valid estimate when a predetermined sample count is reached.

12. Beam position monitoring apparatus as defined in claim 11 wherein said sampling means comprises a first channel for sampling one of the sensed signals and a second channel for sampling the other of the sensed signals and further comprising channel switching means coupled between said pair of electrodes and said sampling means for switching the sensed signals v(t) and w(t) between said first and second channels in first and second switch states during calculation of the estimate so that the estimate is independent of mismatch in the signal processing means.

13. Beam position monitoring apparatus as defined in claim 12 wherein said channel switching means is responsive to said counter means to change states after one half of the predetermined sample count is reached.

14. Beam position monitoring apparatus as defined in claim 13 wherein said channel switching means further includes means for changing the sign of $\frac{1}{2} \ln |v_i|/|w_i|$ in accordance with said first and second switch states.

15. Signal processing apparatus for receiving electrical signal v(t) and w(t) from a pair of sensors and for determining an estimate of a parameter from said signals, said apparatus comprising:
    a first channel for receiving one of said electrical signals and for conveying a representative of said one signal to a first sampling means;
    a second channel for receiving the other of said electrical signals and for conveying a representative of said other signal to a second sampling means;
    first sampling means connected to said first channel for sampling the representative conveyed by said first channel at prescribed intervals and for converting the representative to a digital sample denoted by $v_i$;
    second sampling means connected to said second channel for sampling the representative conveyed by said second channel at prescribed intervals and for converting the representative to a digital sample denoted by $w_i$;
    means, connected to said sampling means, for providing a weighted log-ratio of the form $$\alpha \left(\sum_{i=1}^{N} P_i \ln\left(\frac{|v_i|}{|w_i|}\right)\right) \Big/ \left(\sum_{i=1}^{N} P_i\right),$$

where $|v_i|$ denotes the absolute value of $v_i$,
$|w_i|$ denotes the absolute value of $w_i$,
N is the number of sample pairs,
$P_i$ is a weight determined by $v_i$ and $w_i$, and $\alpha$ is a constant;
    means, connected to said means for providing a weighted log-ratio, for deriving an estimate of said parameter; and channel switching means, connected between said first channel and said second channel, for switching the sensed signals v(t) and w(t) between said first and second channels in first and second switch states during calculation of the estimate so that the estimate is independent of mismatch in the signal processing means.

16. Signal processing apparatus as defined in claim 15 wherein said means for deriving said estimate includes programmable read only memory means for storing the function tanh (Z), where Z is the value provided to said memory means by said means for providing.

17. Signal processing apparatus as defined in claim 15 wherein said means for providing a weighted log ratio includes a programmable read only memory, connected to a means for providing absolute values, for storing the function $\frac{1}{2} |v_1|/|w_1|$.

18. Signal processing apparatus as defined in claim 15 wherein said means for providing said weighted log ratio includes a programmable read only memory, connected to a means for providing absolute values, for storing the function $P_1 \frac{1}{2} \ln |v_i|/|w_1|$.

19. Signal processing apparatus as defined in claim 15 wherein said first sampling means includes a first analog-to-digital converter and said second sampling means comprises a second analog-to-digital converter.

20. Signal processing apparatus as defined in claim 15 including means for providing Pi as a binary value of 1 or 0.

21. Signal processing apparatus as defined in claim 20 wherein said means for providing said weighted log ratio comprises means for determining $P_i$ to have a value of 1 if the value of $|v_i|+|w_i|$ is greater than a predetermined threshold level, $|v_i|$ is within a predetermined range and $|w_i|$ is within a predetermined range, and a value of 0 otherwise.

22. Signal processing apparatus as defined in claim 21 wherein the means for providing a weighted log ratio includes first programmable read only memory means for storing the value of $\frac{1}{2} \ln |v_i|/|w_i|$ and the values of the weights $P_i$ and a multiplier/accumulator for accumulating the values of $\frac{1}{2} \ln |v_i|/|w_i|$ when $P_i$ has a value of 1.

23. Signal processing apparatus as defined in claim 22 wherein said channel switching means is responsive to a counter means to change states after one half of the predetermined sample count is reached.

24. Apparatus for monitoring the position of a beam and for providing an estimate of beam position relative to a coordinate system, said apparatus comprising:
a pair of electrodes positioned adjacent to the beam to cause sensed signals v(t), w(t) to be induced on said pair of electrodes, respectively, by the beam;
signal processing means coupled to said pair of electrodes for determining an estimate of the beam position, including
means for sampling the sensed signals v(t), w(t) at prescribed intervals and for converting the sensed signals to digital samples $v_i$, $w_i$, said sampling means comprising a first channel for sampling one of the sensed signals and a second channel for sampling the other of the sensed signals, and
means for calculating $$\text{estimate} = \tanh\left[\frac{1}{2}\left(\sum_{i=1}^{N} P_i \ln\left(\frac{|v_i|}{|w_i|}\right)\right)\bigg/\left(\sum_{i=1}^{N} P_i\right)\right]$$

estimate=tanh
as an estimate of beam position, where N=number of sample pairs used in estimate and $P_i$ has a value of 1 if the value of $|v_i|+|w_i|$ is greater than a predetermined threshold level, $|v_i|$ is within a predetermined threshold level, $|v_i|$ is within a predetermined range and $|w_i|$ is within a predetermined range, and has a value of 0 otherwise; and
channel switching means coupled between said pair of electrodes and said sampling means for switching the sensed signals v(t) and w(t) between said first and second channels in first and second switch states during calculation of the estimate so that the estimate is independent of mismatch in the signal processing means.

25. Signal processing apparatus for receiving electrical signals v(t) and w(t), induced by a source on a pair of sensors, from said sensors positioned at some distance from said source, for determining a position estimate of said source from said signals, and for controlling the position of the source, said apparatus comprising:
means for sampling the sensed signals v(t) and w(t) at prescribed intervals and converting said sensed signal to digital samples $v_1$, $w_i$, and
means responsive to said digital signals, for generating an electrical signal representative of the value $$\tanh\left[\frac{1}{2}\left(\sum_{i=1}^{N} P_i \ln\left(\frac{|v_i|}{|w_i|}\right)\right)\bigg/\left(\sum_{i=1}^{N} P_i\right)\right]$$

as the position estimate of said source, where N=the number of sample pairs used in the estimate and $P_i$ is a weight determined by $v_i$ and $w_i$, and a feedback system to control the beam based on determinations of beam position.

* * * * *